(12) United States Patent
Vespe et al.

(10) Patent No.: US 7,778,952 B2
(45) Date of Patent: Aug. 17, 2010

(54) DISPLAYING FACTS ON A LINEAR GRAPH

(75) Inventors: David J. Vespe, Larchmont, NY (US); Andrew W. Hogue, Ho Ho Kus, NJ (US); Alexander Kehlenbeck, Brooklyn, NY (US); Michael Gordon, Brooklyn, NY (US); Jeffrey C. Reynar, New York, NY (US); David B. Alpert, Hoboken, NJ (US)

(73) Assignee: Google, Inc., Mountain View, CA (US)

( * ) Notice: Subject to any disclaimer, the term of this patent is extended or adjusted under 35 U.S.C. 154(b) by 309 days.

(21) Appl. No.: 11/535,843

(22) Filed: Sep. 27, 2006

(65) Prior Publication Data

US 2007/0179952 A1    Aug. 2, 2007

Related U.S. Application Data

(63) Continuation-in-part of application No. 11/342,277, filed on Jan. 27, 2006.

(51) Int. Cl.
*G06N 7/00*     (2006.01)

(52) U.S. Cl. .................. 706/56; 707/798; 707/802; 707/728

(58) Field of Classification Search .............. 706/56; 707/7, 102, 798, 802, 728
See application file for complete search history.

(56) References Cited

U.S. PATENT DOCUMENTS

| | | | |
|---|---|---|---|
| 5,475,819 A | 12/1995 | Miller et al. | |
| 5,560,005 A | 9/1996 | Hoover et al. | |
| 5,574,898 A | 11/1996 | Leblang et al. | |
| 6,480,194 B1* | 11/2002 | Sang'udi et al. | 345/440 |
| 6,529,900 B1* | 3/2003 | Patterson et al. | 707/3 |
| 6,609,123 B1* | 8/2003 | Cazemier et al. | 707/4 |
| 6,928,436 B2* | 8/2005 | Baudel | 707/6 |
| 6,968,343 B2 | 11/2005 | Charisius et al. | |
| 2002/0154175 A1 | 10/2002 | Abello et al. | |
| 2003/0154071 A1 | 8/2003 | Shreve | |
| 2003/0158855 A1 | 8/2003 | Farnham et al. | |
| 2004/0107125 A1 | 6/2004 | Guheen et al. | |
| 2004/0125137 A1* | 7/2004 | Stata et al. | 345/764 |
| 2004/0267700 A1* | 12/2004 | Dumais et al. | 707/2 |

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.

(Continued)

*Primary Examiner*—Donald Sparks
*Assistant Examiner*—Mai T Tran
(74) *Attorney, Agent, or Firm*—Morgan, Lewis & Bockius LLP

(57) ABSTRACT

A set of objects having facts is established. Facts of objects having positions in an order are identified. Some facts explicitly describe the positions in the linear order, while are facts do not explicitly describe the positions. The facts are presented in the order on a linear graph, such as a timeline. Facts of the objects describing geographic positions are presented on a map.

28 Claims, 12 Drawing Sheets

OTHER PUBLICATIONS

Brin, S., "Extracting Patterns and Relations from the World Wide Web," 12 pages.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages.
Dean, J. et al., "MapReduce: Simplified Data Processing on Large Clusters," To appear in OSDI 2004, pp. 1-13.
Etzioni, O. et al., "Web-scale Information Extraction in KnowItAll (Preliminary Results)," WWW2004, ACM, May 17-20, 2004, 11 pages.
Freitag, D. et al., "Boosted Wrapper Induction," American Association for Artificial Intelligence, 2000, 7 pages.
Guha, R. et al., "Disambiguating People in Search," WWW2004, ACM, May 17-22, 2004, 9 pages.
Guha, R., "Object Co-identification on the Semantic Web," WWW2004, ACM, May 17-22, 2004, 9 pages.
Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.
"Information Entropy—Wikipedia, the free encyclopedia," [online] [Retrieved on May 3, 2006] Retrieved from the Internet<URL:http://en.wikipedia.org/wiki/lnformation_entropy>.
"Information Theory—Wikipedia, the free encyclopedia," [online] [Retrieved on May 3, 2006] Retrieved from the Internet<URL:http://en.wikipedia.org/wiki/Information_theory>.
Jones, R. et al., "Bootstrapping for Text Learning Tasks," 12 pages.
Kosseim, L, et al., "Answer Formulation for Question-Answering," 11 pages.
Liu, B. et al., "Mining Data Records in Web Pages," Conference '00, ACM, 2000, pp. 1-10.
McCallum, A. et al., "Object Consolodation by Graph Partitioning with a Conditionally-Trained Distance Metric," SIGKDD '03, ACM, Aug. 24-27, 2003, 6 pages.
Mihalcea, R. et al., "PageRank on Semantic Networks, with Application to Word Sense Disambiguation," 7 pages.
Mihalcea, R. et al., "TextRank: Bringing Order into Texts," 8 pages.
PCT International Search Report and Written Opinion, PCT/US06/07639, Sep. 13, 2006, 6 pages.
Prager, J. et al., "IBM's Piquant in TREC2003," 10 pages.
International Search Report and Written Opinion for PCT/US2007/61158 dated Feb. 28, 2008.

* cited by examiner

Example Format Of Facts In Repository
(Each Fact Is Associated With An Object ID)

Example Of Facts In Repository
(Each Fact Is Associated With An Object ID)

210

| Object ID=1 | Fact ID=10 |
| --- | --- |
| Object ID=1 | Fact ID=20 |
| Object ID=1 | Fact ID=30 |
| Object ID=2 | Fact ID=40 |

•
•
•

Example Object Reference Table

FIG. 2C

| Object ID | Fact ID | Attribute | Value | Link | Metrics | Sources | Agent |
|---|---|---|---|---|---|---|---|
| 209 | 210 | 212 | 214 | 216 | 218 | 220 | 222 |

| Object ID | Fact ID | Attribute | Value | Link | Metrics | Sources | Agent |
|---|---|---|---|---|---|---|---|
| 209 | | | | | | | |

| Object ID | Fact ID | Name | Value | Link | Metrics | Sources | Agent |
|---|---|---|---|---|---|---|---|
| 209 | | 224 | | | | | |

| Object ID | Fact ID | Property | Value | Link | Metrics | Sources | Agent |
|---|---|---|---|---|---|---|---|
| 209 | | 226 | | | | | |

Example Format Of Facts In Repository
(Each Fact Is Associated With An Object ID)

Example Objects

FIG. 5

DISPLAYING FACTS ON A LINEAR GRAPH

CROSS-REFERENCE TO RELATED APPLICATION

This application is a continuation-in-part of U.S. application Ser. No. 11/342,277, entitled "Data Object Visualization Using Graphs," filed Jan. 27, 2006, which is hereby incorporated by reference in its entirety.

BACKGROUND OF THE INVENTION

1. Field of the Invention

This invention pertains in general to data visualization on a computer and, in particular, to ways of representing data obtained from web pages and other sources.

2. Description of the Related Art

The World Wide Web and other information storage and retrieval systems contain a great deal of information. With the advent of search engines and other similar tools it has become relatively easy for a user to locate particular information. For example, one can obtain a wealth of information about World War II by simply searching for the phrase "World War II" on the Web.

Information on the web is not always in a format that is easy for the user to comprehend. A web site describing biographic information for a person might not present the information in a graphical manner. Some web sites, like sites providing stock prices and other financial information, provide limited graphing abilities. For example, a person can interact with such sites to create and manipulate graphs showing stock prices over time. Even on these sites, however, the person is restricted to a limited set of graphing options.

Moreover, the sites do not permit the user to graph and compare data from across different web sites. For example, there might be three different web sites respectively describing major US battles of WWII, WWII battles from 1939-1941, and Russian WWII battles. These sites contain related information and a user might find it beneficial to display information from all three sites in a single, easy to understand format.

Therefore, there is a need in the art for a way to enable the user to organize and view ordered information from web pages in a way that makes it easier to comprehend.

SUMMARY OF THE INVENTION

Embodiments of the invention provide a method, system, and computer program product for presenting facts from an electronic document, such as a web page, on a linear graph. In one embodiment, the method, system, and computer program product establish a set of objects, each object having a set of two or more facts, each fact having an attribute and a corresponding value. The method, system, and computer program product identify a fact of an object in the set having a position in a linear order, and identify other facts of objects in the set having positions in the linear order. Then, the method, system, and computer program product present a linear graph displaying the facts in the linear order.

In one embodiment, the method establish a set of data in a memory of a computer, the data describing two or more facts, each fact having an attribute and a corresponding value. The method identifies a fact of the data in the set having a position in a linear order, and identifies other facts of data in the set having positions in the linear order. Then, the method presents a linear graph displaying the facts in the linear order.

BRIEF DESCRIPTION OF THE DRAWINGS

FIGS. 2(a)-2(d) are block diagrams illustrating a data structure for facts within a repository of FIG. 1 in accordance with embodiments of the invention.

FIG. 5 illustrates a linear graph presented by the presentation module according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
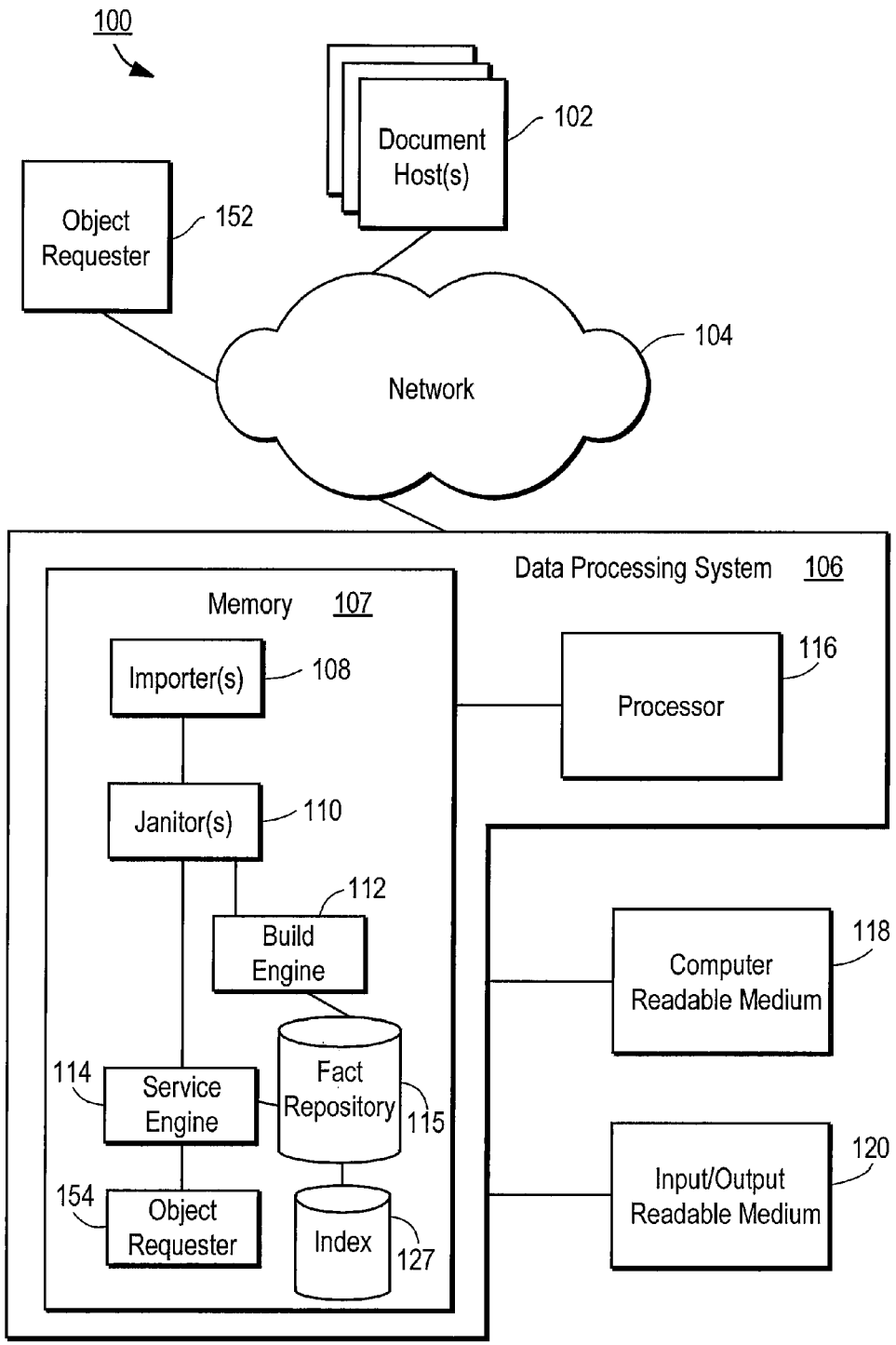
FIG. 1 shows a system architecture adapted to support one embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names and values, and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

In one embodiment, the contents of the facts in the repository 115 are also indexed in index 127. The index 127 maintains a term index, which maps terms to {object, fact, field, token} tuples, where "field" is, e.g., an attribute or value. The service engine 114 is adapted to receive keyword queries from clients such as object requestors 154, and communicates with the index 127 to retrieve the facts that are relevant to user's search query. For a generic query containing one or more terms, the service engine 114 assumes the scope is at the object level. Thus, any object with one or more of the query terms somewhere (not necessarily on the same fact) will match the query for purposes of being ranked in the search results. The query syntax can also be used to limit results to only certain objects, attributes, and/or values.

In one embodiment the ranking (score) of an object is a linear combination of relevance scores for each of the facts. The relevance score for each fact is based on whether the fact includes one or more query terms (a hit) in either the attribute or value portion of the fact. Each hit is scored based on the frequency of the term that is hit, with more common terms getting lower scores, and rarer terms getting higher scores (e.g., using a TD-IDF based term weighting model). The fact score is then adjusted based on additional factors. These factors include the appearance of consecutive query terms in a fact, the appearance of consecutive query terms in a fact in the order in which they appear in the query, the appearance of an exact match for the entire query, the appearance of the query terms in the name fact (or other designated fact, e.g., property or category), and the percentage of facts of the object containing at least one query term. Each fact's score is also adjusted by its associated confidence measure and by its importance measure. Since each fact is independently scored, the facts most relevant and important to any individual query can be determined, and selected. In one embodiment, a selected number (e.g., 5) of the top scoring facts are retrieved in response to query.

Figure 2A:
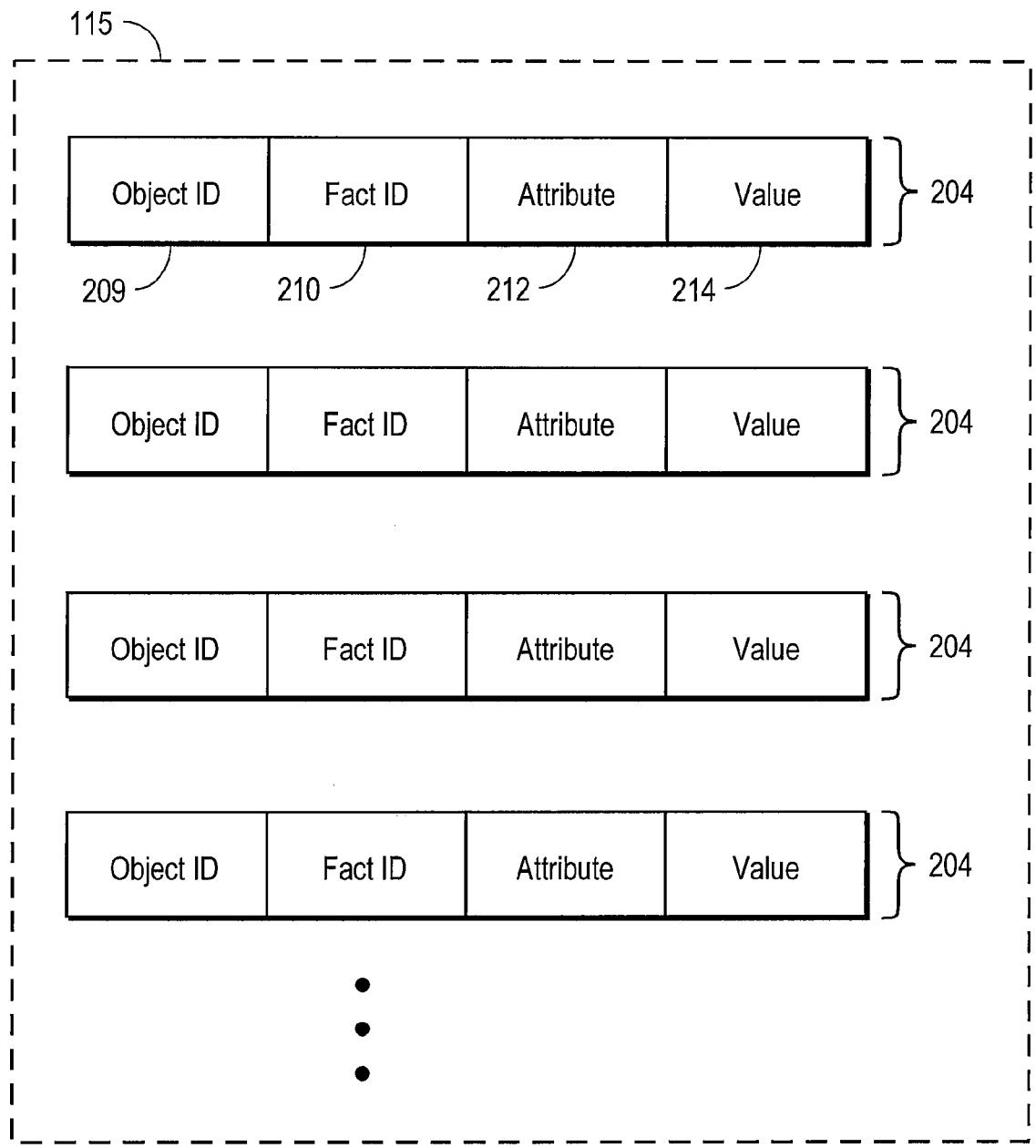

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
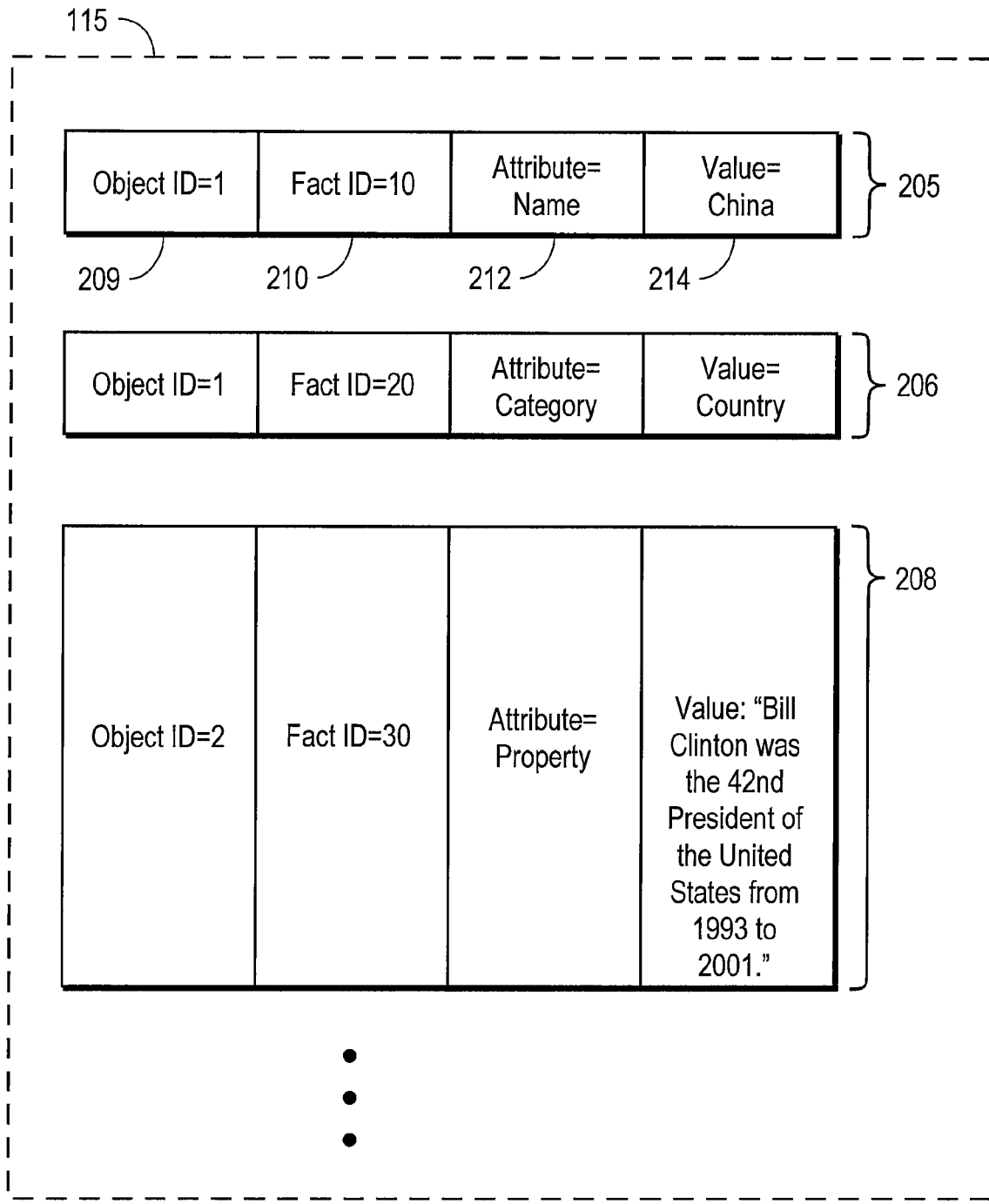

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
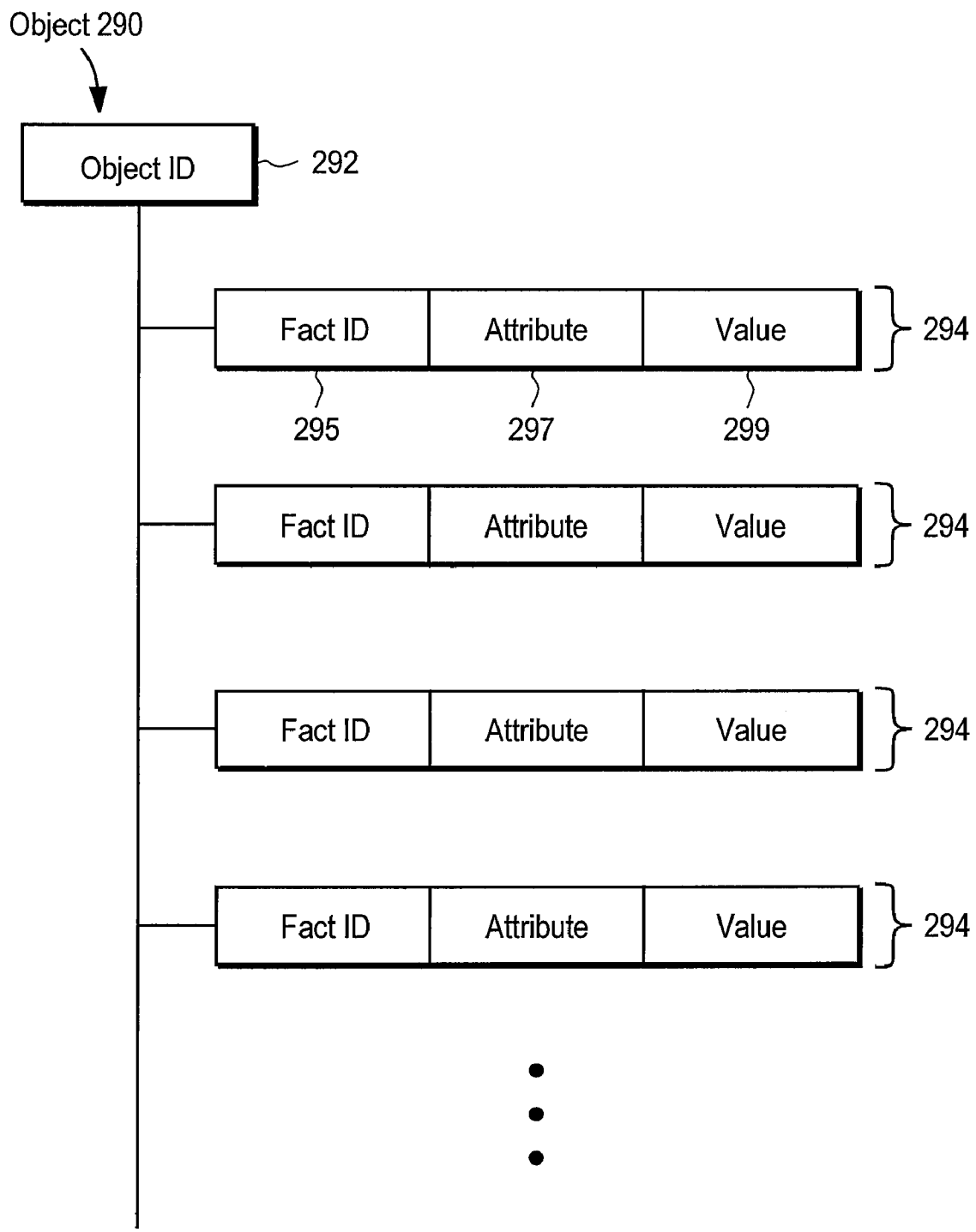
FIG. 2(e) is a block diagram illustrating an alternate data structure for facts and objects in accordance with embodiments of the invention.

FIG. 2(e) is a block diagram illustrating an alternate data structure 290 for facts and objects in accordance with embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3:
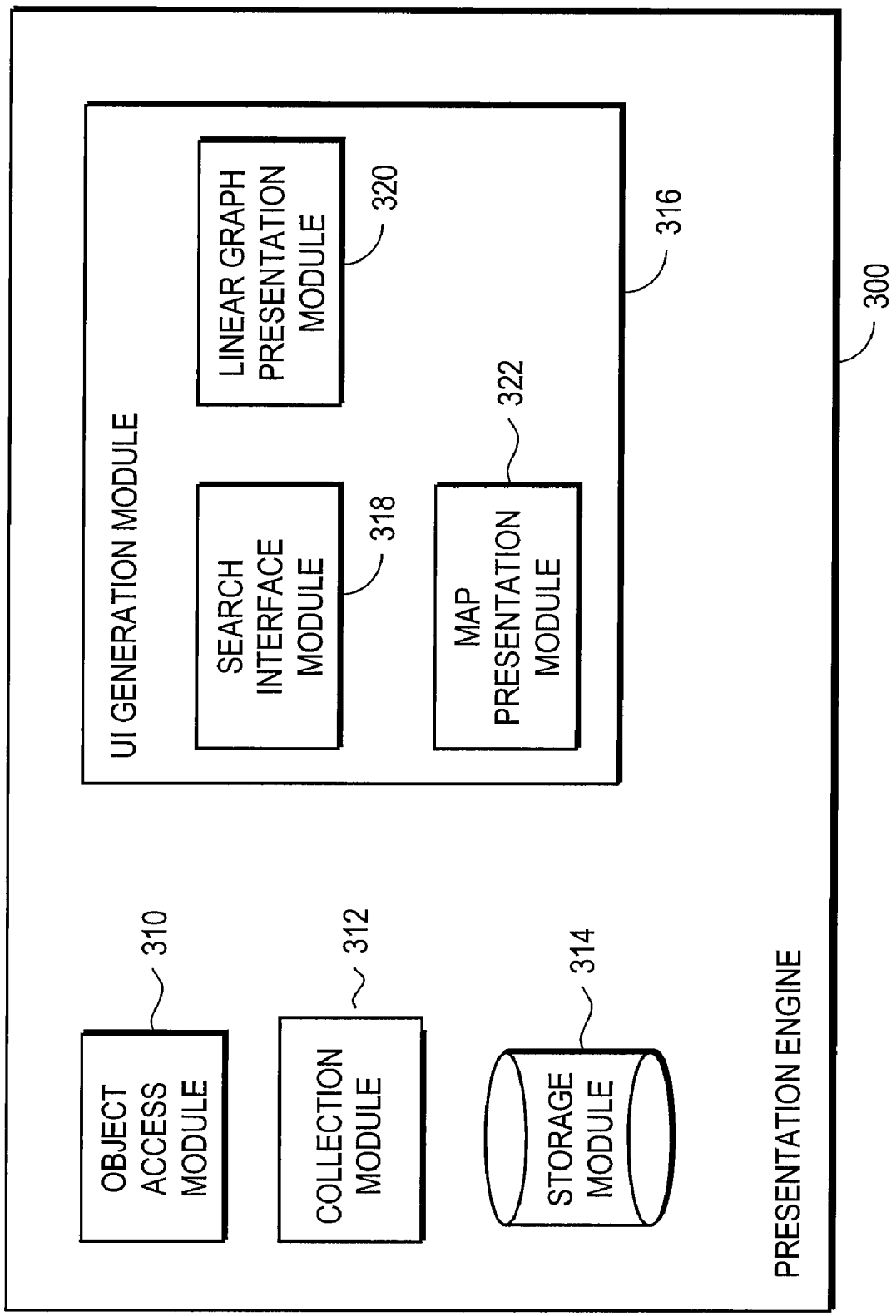
FIG. 3 is a high-level block diagram illustrating modules within a presentation engine according to one embodiment.

FIG. 3 is a high-level block diagram illustrating modules within a presentation engine 300 according to one embodiment. As used herein, the term "module" refers to computer program logic and/or data for providing the specified functionality. A module can be implemented in hardware, firmware, and/or software. Some embodiments have different and/or additional modules than those shown in FIG. 3. Moreover, the functionalities can be distributed among the modules in a different manner than described here.

A presentation engine 300 presents objects and facts in an automated and customizable manner. That is, the presentation engine 300 provides flexible tools that enable a user to automatically create customized views of the facts associated with one or more objects. The presentation engine 300 thus allows the user to view information in a way that is more comprehensible to the user.

In one embodiment, the modules of the presentation engine 300 are implemented as a JavaScript program that executes on client devices such as personal computers, mobile telephones, personal digital assistants (PDAs), handheld gaming devices, etc. The JavaScript program interfaces with the data processing system 106 to access data and functionalities provided by it. The JavaScript program itself is controlled by a web browser, operating system, or other entity executing on the client device. In one embodiment, the JavaScript program uses Asynchronous JavaScript and XML (AJAX) technology to interface with the data processing system 106 and obtain data. In other embodiments, the presentation engine 300 is implemented using different coding techniques and/or technologies, relies solely on client-side data, and/or executes on the server.

An object access module 310 receives objects and facts from the repository 115 and/or another source. In one embodiment, the object access module 310 is an object requester 152 and receives objects from the service engine 114 in response to search queries executed by a user. For example, assume that the repository 115 stores a set of objects related to United States presidents, other politicians, and related public figures, including at least one object for President Bill Clinton. Also assume that the user executes a query for objects or facts that match the phrase "Bill Clinton." In response, the object access module 310 receives objects or facts related to Bill Clinton, including the object for Bill Clinton, an object for Hillary Clinton, an object for Monica Lewinsky, and facts and objects for other people, events, and/or places related to Bill Clinton. In another embodiment, the object access module 310 interfaces with an Internet search engine, such as the search engine provided by GOOGLE INC. of Mountain View, Calif. The object access module 310 provides a search query to the search engine and receives in return web pages and/or other electronic documents satisfying the query.

In one embodiment, the object access module 310 and/or another module allows the user to select particular returned objects (or documents) and designate the objects for further analysis. In this manner, the user can execute multiple different searches on the repository 115 and designate objects from the different searches for further analysis. In another embodiment, the user does not need to designated objects; all objects returned in response to a query are automatically designated for analysis.

In one embodiment, a collection module 312 receives the objects designated for further analysis. The collection module 312 can store multiple collections of objects simultaneously. In one embodiment, the user specifies the collection in which the collection module 312 stores the objects. In other embodiments, the collection module 312 stores designated objects in a default collection if the user does not specify a particular collection. The collection module 312 provides an interface allowing the user to manipulate the collections and the objects within the collections. For example, the user can view the objects within different collections, and add and remove objects.

Although much of this discussion focuses on a collection containing objects related to Bill Clinton, a collection can hold arbitrary and heterogeneous objects. For example, a collection can contain objects for the atomic elements, baseball teams, the actors M. Emmet Walsh and Harry Dean Stanton, and the country China. Some heterogeneous objects may have attributes in common, while other objects might not have any common attributes.

Moreover, in one embodiment, the collection module 312 stores data and/or references to data other than objects from the repository 115. These data are not necessarily structured in the same manner as the objects, or even structured at all. For example, the collection module 312 can store web pages or links to web pages on the Internet received in response to a search. In addition, the collection module 312 can store data describing attributes of consumer products offered for sale, such as data describing prices and features. Likewise, the collection module 312 can also hold facts extracted from their associated objects.

In one embodiment, the data of collection module 312 describe facts having positions in inherent linear orders. A fact with a position in an inherent linear order is one where the value of the fact has a defined position in an inherent linear sequence. For example, values that are dates have inherent positions in the time dimension. Likewise, values that are prices, populations, or other numeric values have positions in inherent linear orders based on their numeric values (e.g., from low to high numbers). In contrast, a value that is a name or other arbitrary text string does not have a position in an inherent linear order (except perhaps alphabetical order). In one embodiment, the inherent order is a predefined order, such as an order of steps associated with a manufacturing process or a decision process. Often, the name of an attribute indicates that its fact has a position in an inherent linear order. For example, the word "date" in the name "date of birth" suggests that the corresponding value is a date and, therefore, the fact has a position in an inherent linear order in the time dimension.

A storage module 314 stores the collections and/or other data used by the presentation engine 300 for its operation. The storage module 314 acts as a place where other modules in the presentation engine 300 can store and retrieve information. In one embodiment, the storage module 314 is a logical construct that uses storage allocated from virtual memory on the client device on which the presentation engine 300 is executing. In other embodiments, some or all of the storage provided by the storage module 314 is located on a server connected to the client via the network 104. For example, the collection module 312 can store collections in the storage module 314. The storage module 314 stores the data describing the collections and references to the objects within the collections in a memory on the client. However, the objects themselves are stored on a server accessible via the network 104 and retrieved from the server when necessary or desired.

A user interface (UI) generation module 316 generates a UI for the user. Generally, the UI allows the user to view and manipulate the objects and/or other data within the collection module 312 or otherwise accessible to the presentation engine 300. In addition, the UI allows the user to control other aspects of the presentation engine 300, such as executing a search for new objects and designating objects or other data for storage in a collection. In one embodiment, the UI is generated automatically based on preferences established by the user and/or other parameters. For example, the UI generation module 316 can be configured to automatically generate a timeline, map, and/or other type of graph based on the facts of objects returned in response to a search query. The UI is displayed on a display device of the client and contains buttons, list boxes, text boxes, images, hyperlinks, and/or other tools with which the user can control the presentation engine and UIs.

In one embodiment, the UI generation module 316 includes other modules for generating specific UI elements. These modules include a search interface module 318 for providing a search interface that the user can use to generate searches on the objects in the repository. In one embodiment, the search interface UI is a text box in which the user inputs textual queries. Other embodiments support different types of queries and query input techniques.

In one embodiment, the search interface module 318 provides search queries to the service engine 114, which executes the query against the repository 115, Internet search engine, and/or other collections of data and returns the results to the object access module 310. Depending upon the embodiment, additional processing of the query, such as term expansion, is performed by the search interface module 318 and/or the service engine 114.

The query syntax supported by the search interface module 318 and/service engine 114 allows the user to provide terms/words that an object (or fact associated with an object) must contain in order to be returned in response to the query. For example, a search for the words "Bill Clinton" will return all of the objects having the words "Bill" and "Clinton" in any of their facts. In one embodiment, the query syntax supports synonym expansion, so that a search for "Bill" will also match "William." A user can provide quotes around the query term to force searching for the exact term.

In addition, the query syntax supports type-specific restrictions to limit results to a particular object type domain. For example, a query that includes "type:person" limits results to objects containing facts about a person and a query that includes "type:country" limits results to objects containing facts about a country. Further, an embodiment of the query syntax allows the user to specify attributes of interest. These attributes are displayed in association with the object. For example, the query "attribute {"date of birth"} specifies the date of birth attribute and the query "attribute {inauguration}" specifies the date of inauguration attribute. In one embodiment, the presentation engine 300 automatically displays these attributes on a graph upon establishing the collection of objects in response to the query. The presentation engine 300 can be configured to show other attributes on the graph as well.

In one embodiment, the query results are returned ranked by relevance. The syntax allows the user to specify the maximum number of objects to match and thereby allows the user to restrict results to only the most relevant matches. Further, the syntax allows the user to specify the maximum number of facts to show for an object. For example, the query:

Bill Clinton attribute {"date of birth"} type:person/max entities=10, max facts=1 returns the facts of objects for 10 people, and shows only the date of birth fact for those objects. In contrast, the query:

name:"Bill Clinton" attribute {"date of birth"}/max entities=1, max facts=15 returns the object for one person—Bill Clinton—and shows his date of birth and up to 14 other significant facts about him.

A linear graph presentation module 320 generates UI elements displaying facts of objects on linear (one-dimensional) graphs. In one embodiment, the linear graph is a timeline and shows dates described by the facts of the objects being graphed. In other embodiments, the linear graph is based on a linear order other than time, such as on price or another numeric value, alphabetical order, etc.

In one embodiment, the linear graph presentation module 320 provides UI tools allowing the user to sort and/or colorize the graphed data to make the results easier to understand. For example, in the search "type: 'US president'" the user might decide to display different presidents' events in different colors, to better contrast their life spans and periods of activity. Alternatively, the user might use the module 320 to cause each attribute to take on a different color (consistent across all objects) to better highlight when important events occurred.

Similarly, an embodiment of the linear graph presentation module 320 allows the user to choose the types of facts shown on the linear graph. For example, for a query including "type: country" the module 320 presents a default graph that views important dates such as when countries were founded, when revolutions occurred, when key leaders assumed power, etc. The user can use the module 320 to switch the view to a different set of facts, such as gross domestic product (GDP), thereby causing the linear graph presentation module 320 to show the GDPs of the countries in the data set in numeric order. In one embodiment, this GDP view contains several entries for each country, for example showing GDPs for several different years and/or GDPs assuming different exchange rates.

A map presentation module 322 generates UI elements displaying facts of objects on maps. The facts of objects specify geographic locations, such as countries, places of births and deaths, etc. either explicitly (e.g., latitude/longitude) or implicitly (e.g., by name). The map presentation module 322 generates maps showing these geographic locations. The maps may be stored in the storage module 314 and/or downloaded from a server on the Internet or another network 104 when required.

In one embodiment, the UI generation module 316 displays multiple types of graphs (including maps) simultaneously. Thus, the UI generation module 316 can generate a UI that displays dates from an object on a timeline, and simultaneously displays locations from the object on a map. Likewise, the UI generation module 316 can display multiple instances of the same graph type simultaneously.

Figure 4:
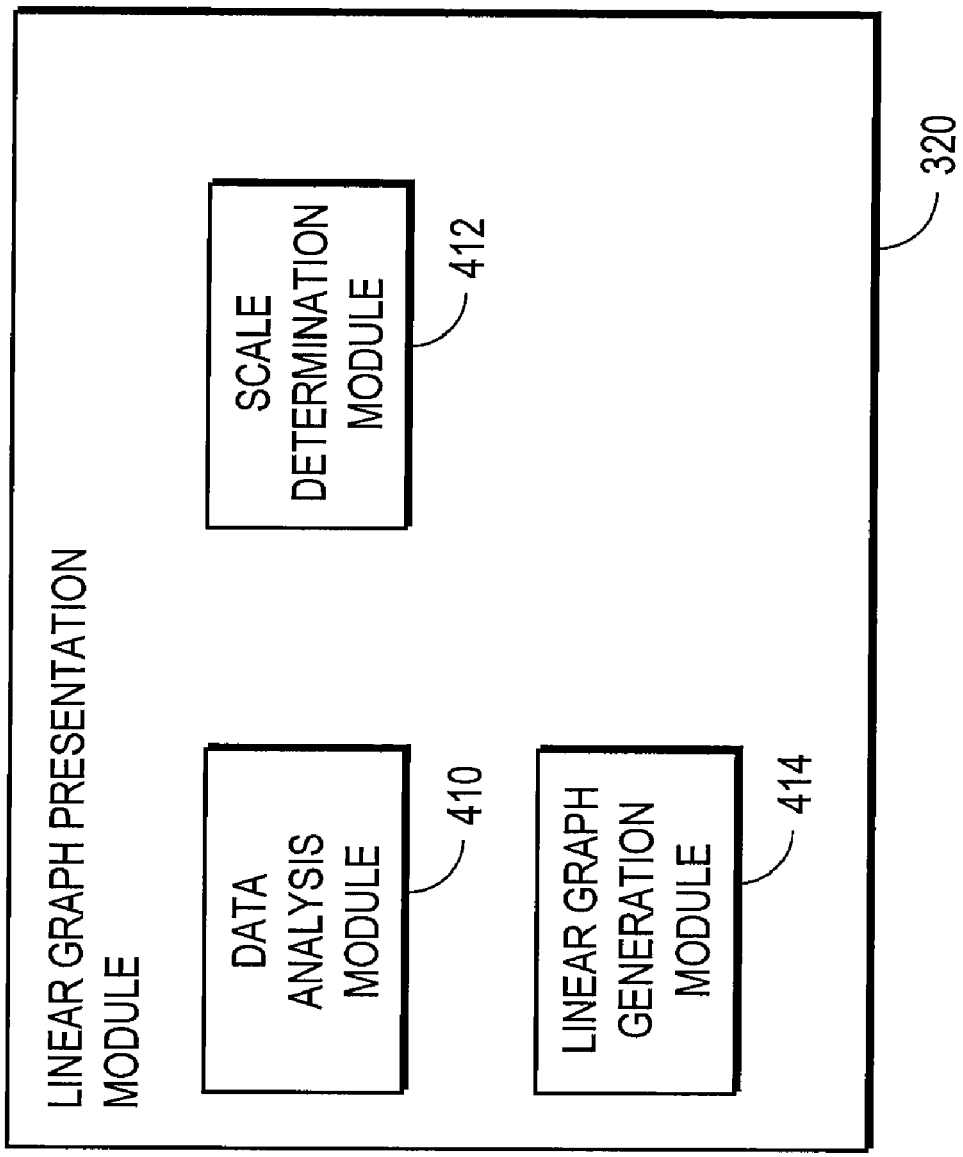
FIG. 4 is a high-level block diagram illustrating modules within the linear graph presentation module according to one embodiment.

FIG. 4 is a high-level block diagram illustrating modules within the linear graph presentation module 320 according to one embodiment. Other embodiments have different and/or additional modules than the ones described here. Moreover, the functionalities can be distributed among the modules in a different manner.

A data analysis module 410 analyzes data to identify dates and other sequenceable values contained therein. In one embodiment, the data analysis module 410 analyzes objects, web pages, and/or other data within the collection module 312 for dates. Some facts of objects from the repository 115 have associated meta-data that explicitly identify the value of a fact as a date. For example, the object associated with Bill Clinton has a "Date of Birth" attribute having a corresponding value (Aug. 19, 1946) that is explicitly identified as a date in a canonical form.

In some instances, the data analysis module 410 analyzes data that do not have explicitly identified dates. These data can include web pages, unstructured text, and other information that might contain dates. In addition, the data can include facts of objects from the repository 115 that are not explicitly identified as dates. In one embodiment, the importers 108 and janitors 110 are strict about the types of values that are annotated as dates when adding facts to objects. In some instances, the data analysis module 410 is less strict about declaring a value a date, and thus is likely to find dates in the facts that are not explicitly identified in the structured data. For example, the importers 108 and janitors might not declare that the value "2000," standing alone, is a date but the data analysis module 410 might treat it as a date for purposes of including it in a timeline. In one embodiment, the context in a web page or other data source in which a date is identified is used to create an attribute for the date. For example, the attribute can be formed from the snippet of text immediately preceding the date in a web page. Thus, the result of the analysis performed by the data analysis module 410 is a set of facts containing dates. Each fact contains an attribute (e.g., date of birth), and a value (e.g., Aug. 19, 1946).

In some embodiments, the data analysis module 410 identifies facts containing values other than dates. In one embodiment the data analysis module 410 computes statistics over the repository 115 and/or another data set to identify facts that can be ordered. For example, the data analysis module 410 can examine the objects in the repository 115 and recognize that the attribute "population" tends to be associated with a value that is a number, and therefore sequenceable.

A scale determination module 412 determines the scale for the linear graph. In one embodiment, the scale determination module 412 identifies the range of dates or other values encompassed by the data to display, and selects a scale that maximizes comprehension of the data. For example, if a range of dates encompasses a period of 50 years, the scale of the graph may be such that every hash mark indicates a period of two years. Similarly, if the range of dates encompass a period of a week, every hash mark might indicates a period of a day, and/or a time within a day. In one embodiment, the scale varies in real-time as the presentation engine 300 and/or a user manipulates the graph.

A linear graph generation module 414 generates linear graphs illustrating facts of objects within the collection module 312 and/or facts from other sources. In one embodiment, the linear graph generation module 414 generates a timeline containing dates identified by the data analysis module 410. The timeline has the scale determined by the scale determination module 412. In other embodiments, the linear graph is not a timeline and graphs a linear order other than time.

Although not explicitly shown in the figures, one embodiment of the map presentation module 322 has modules that perform similar functions to the modules of FIG. 4. For example, the map presentation module 322 includes a module for identifying geographic locations explicitly or implicitly described by the objects and/or other data. In addition, the map presentation module includes a module for determining the scale of the map, and a module for generating the map.

Figure 5:
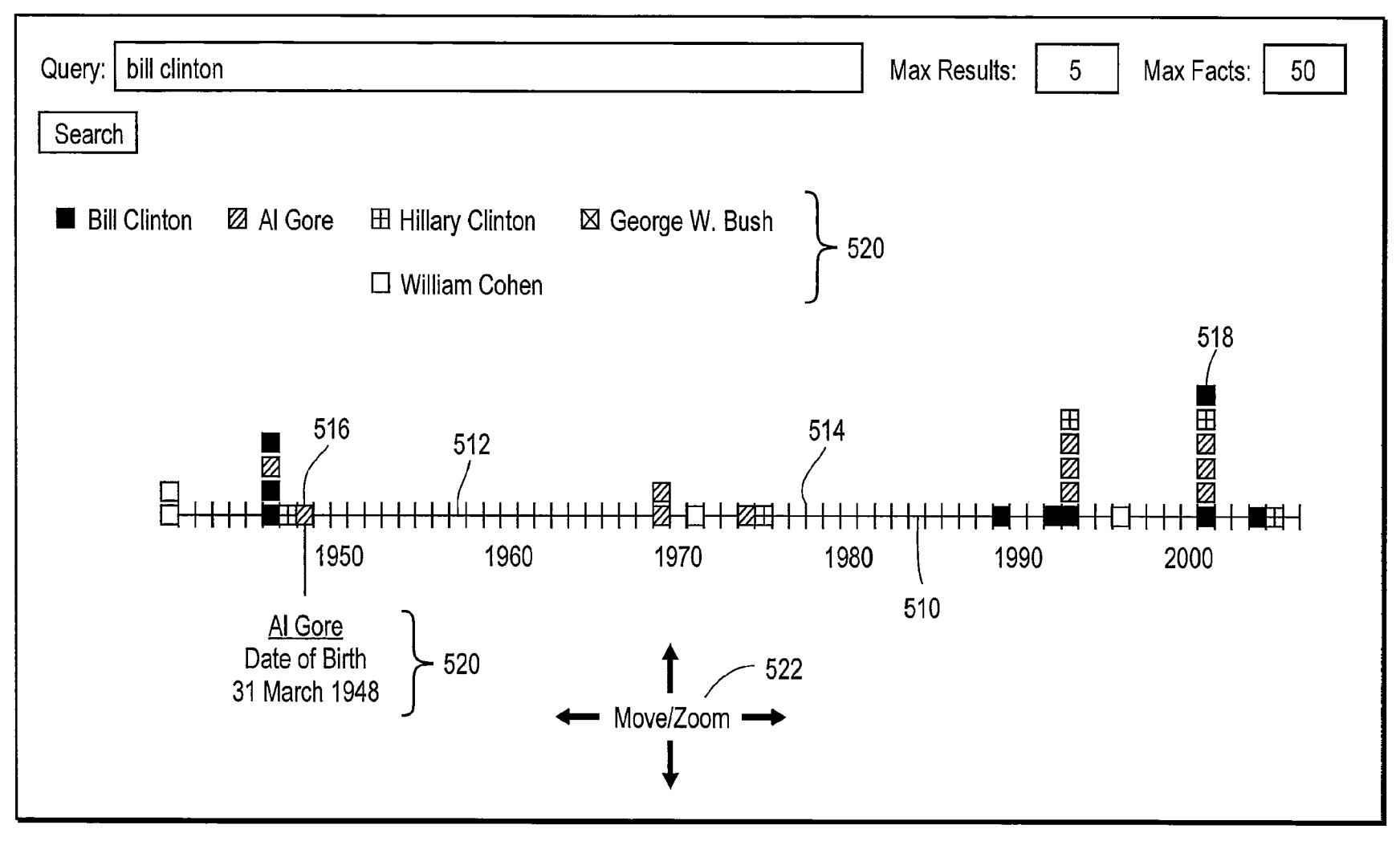

FIG. 5 illustrates a linear graph presented by the presentation module 300 according to one embodiment. FIG. 5 illustrates a sample graph that is a timeline 510. For purposes of example, assume that the timeline 510 is automatically presented in response to a query on objects in the repository 115 that match the string "Bill Clinton." Further, the query is limited to five results and a maximum of 50facts.

The timeline 510 has a scale covering 65 years, from 1940 to 2005. The timeline itself is represented by a horizontal line 512, and each year is indicated by a hash mark 514, a short vertical line intersecting the horizontal line. Icons (identified with reference numeral 516) on the timeline 510 identify dates from facts of objects identified in response to the query. In one embodiment, the icon 516 is a rectangle. A single icon 516 at a location on the timeline indicates that a single fact occurs at the date represented by that location. If there are multiple facts having dates at a single location on the timeline, the icons representing the facts are stacked vertically. For example, in the sample "Bill Clinton" query there are many facts having dates within the year 2000. These facts are represented by a stack 518 of icons at the location on the timeline 510 representing the year 2000.

In one embodiment, each icon 516 on the timeline 510 has a visual characteristic that indicates the source of the fact identified by the icon. The visual characteristic is a shape, color, shading, graphical image, and/or other distinctive characteristic. In another embodiment, the icon 516 is an image associated with the information being displayed, such as a birthday cake for the date of birth or a picture of Bill Clinton for a date associated with Bill Clinton. In one embodiment, the icons 516 are based on images obtained from source documents, possibly resized. In other embodiments, they are stock images. In addition, a key 520 associated with the timeline 510 describes the meaning of the icons. In FIG. 5, each icon 516 represents a different person associated with Bill Clinton, and the key 520 identifies the person associated with the icon. Thus, the key 520 references Bill Clinton, Al Gore, Hillary Clinton, William Cohen, and George W. Bush. Adjacent to each name is an icon corresponding to the icon 516 appearing on the timeline 510 for facts associated with that person.

In one embodiment, a user viewing the timeline 510 uses a cursor or other technique to select icons on the timeline and/or perform other manipulations of the timeline. When an icon 516 is selected, the presentation engine 300 displays information about the fact identified by the icon. In one embodiment, the information is displayed beneath the timeline 510 at a location adjacent to the selected icon. The information includes the name of the object or other source in which the fact is found, the attribute of the fact, and the value for the attribute. In one embodiment, the name includes an embedded hypertext link that the user can use to reference more information from the object or other source of the fact. The attribute, for example, is "Date of Birth," "Elected," "Inauguration," or "Impeached." The value is the date (e.g., "Jan. 20, 1993") and/or a string of text that contains a date (e.g., "On June $1^{st}$, Congress voted to . . . "). In FIG. 5, icon 516 is selected and the information 520 is "Al Gore" (the name of the object), "Date of Birth" (the attribute for the fact), and "31 Mar. 1948" (the value of the fact).

The presentation engine 300 provides a set of controls 522 that the user uses to manipulate the timeline 510. In one embodiment, the controls are formed of four arrows respectively pointing left, right, up, and down. The user selects the left and right arrows to move along the axis of the timeline 510 and selects the up and down arrows to zoom in/out of the timeline. Other embodiments provide different and/or additional controls.

Figure 6:
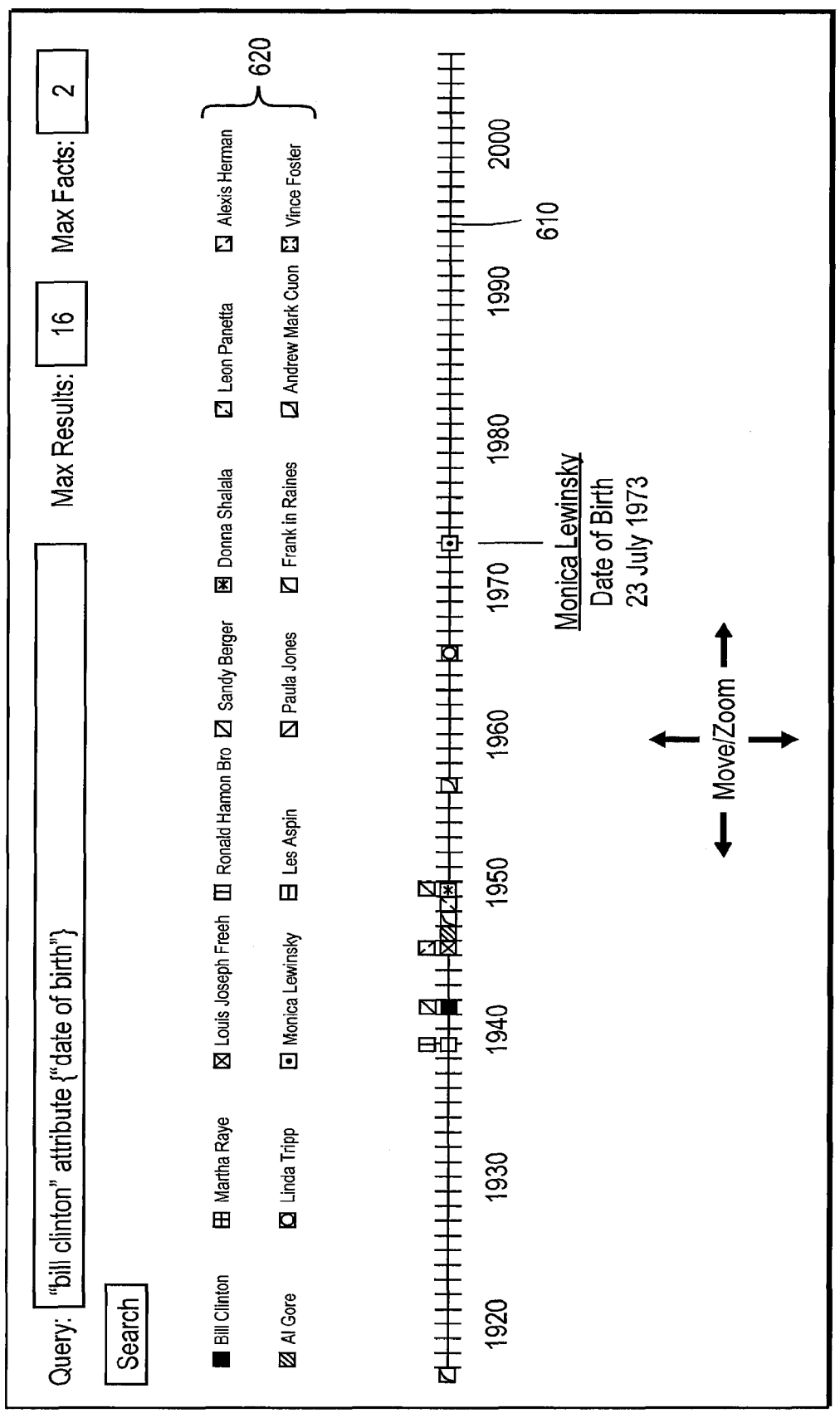
FIG. 6 illustrates a linear graph presented by the presentation engine according to one embodiment.

FIG. 6 illustrates a linear graph presented by the presentation engine 300 according to one embodiment. The graph of FIG. 6 is a timeline 610 produced in response to the query:

"Bill Clinton" attribute{"date of birth"} with a maximum of 16 results and two facts per result. This query identifies facts associated with 16 objects in the repository 115 that contain the exact text "Bill Clinton" and indicates that the "date of birth" attribute is of interest. In response, the query produces objects for 16 people related to Bill Clinton, including Al Gore, Monica Lewinsky, and Martha Raye (who received the Presidential Medal of Freedom from Bill Clinton in 1993). Since the query indicates that the "date of birth" attribute is of interest, the presentation module 300 automatically places the facts having this attribute on the timeline 610. The key 620 and icons on the graph show that Martha Raye was born in 1916, and Monica Lewinsky was born in 1973. In addition, the icons show a cluster of people born in the 1940-1950 time period who are contemporaries of Bill Clinton.

Figure 7:
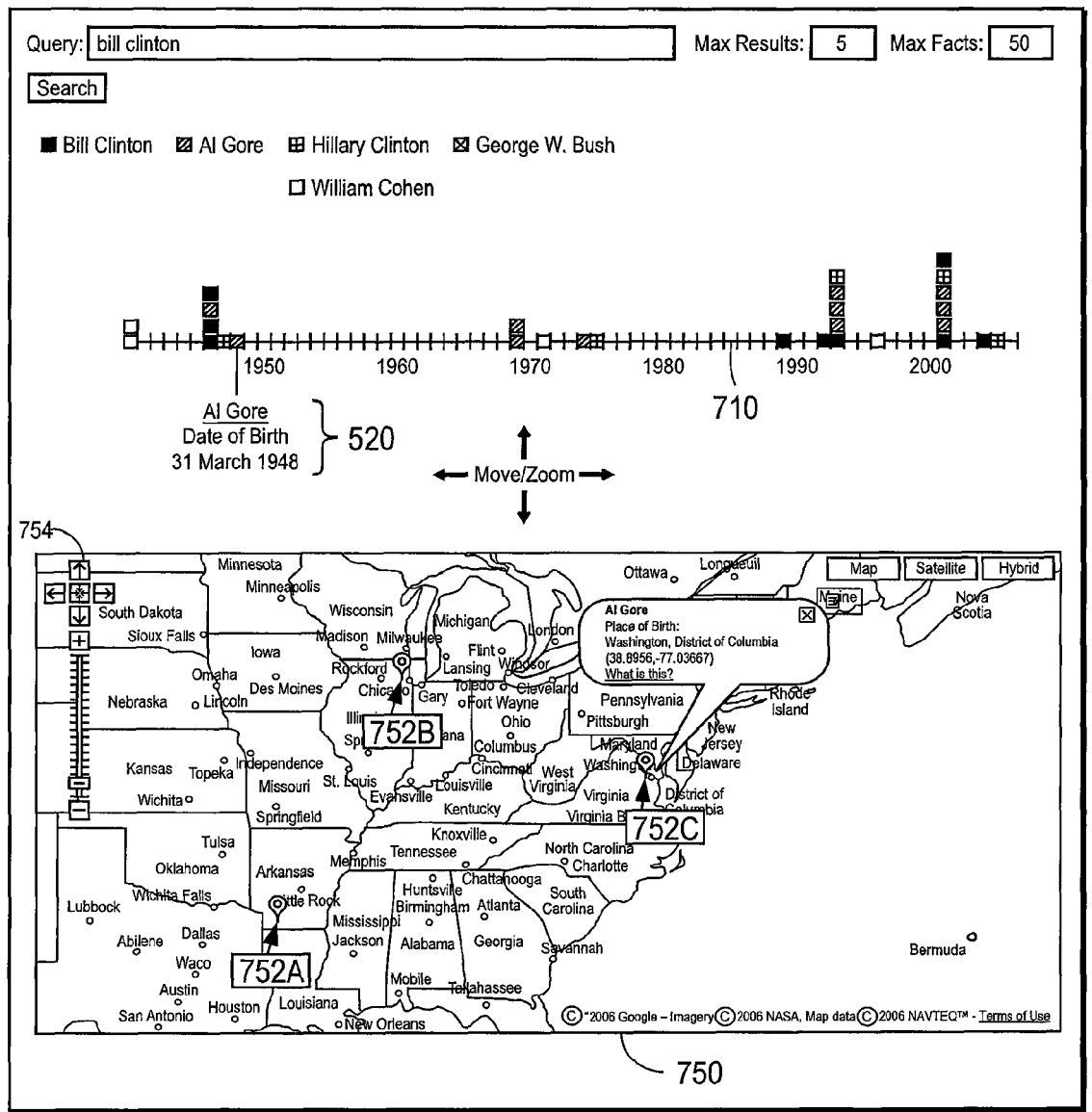
FIG. 7 illustrates a sample display having a linear graph and a map.

FIG. 7 illustrates a sample display 700 having a linear graph 710 and a map 750 presented by the presentation engine 300 in response to a query. In this example, the query is "Bill Clinton" and the linear graph 710 is the same timeline illustrated in FIG. 5. The map 750 represents locations of facts contained in the objects returned in response to the query. Specifically, the map 750 shows the places of birth of the people represented by the objects. Each place of birth is identified by an icon on the map 750. The icon is, for example, a push pin, a picture of the person associated with the object, and/or another graphic. In FIG. 7, the map 750 illustrates an icon at Bill Clinton's birthplace in Hope, Ark., a second icon at Hillary Clinton's birthplace in Chicago, Ill., and a third icon (a picture of Al Gore) at Al Gore's birthplace in Washington, D.C. Further, in one embodiment, the map 750 includes a set of UI controls 754 that the user uses to perform manipulations such as panning and zooming the map.

Figure 8:
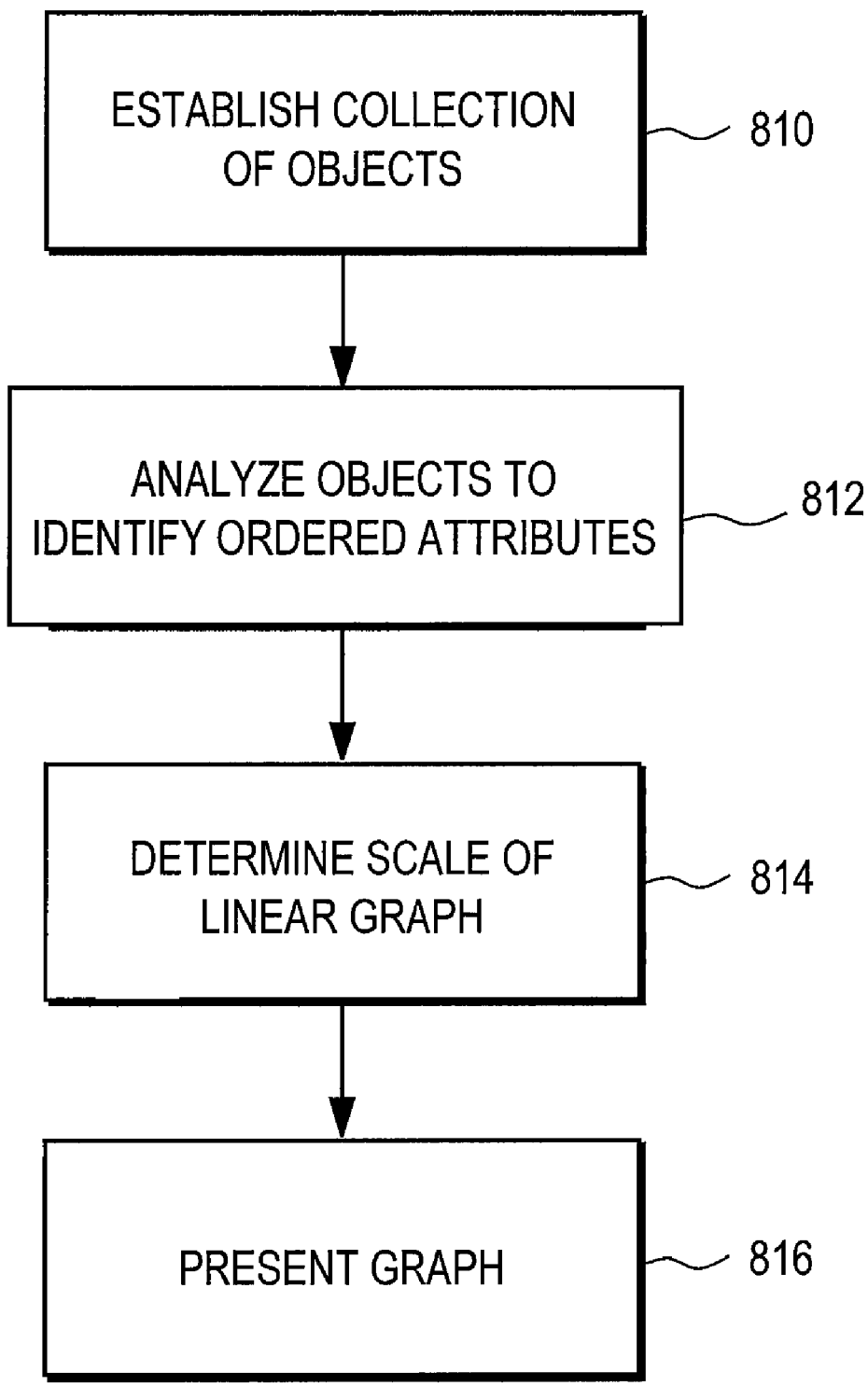
FIG. 8 is a flow chart illustrating steps performed by the presentation engine to present a linear graph according to one embodiment.

FIG. 8 is a flow chart illustrating steps performed by the presentation engine 300 to present a linear graph according to one embodiment. Other embodiments perform the steps in different orders and/or perform different or additional steps than the ones shown in FIG. 8. Initially, the presentation engine 300 establishes 810 a collection of objects. This collection is typically established when a user interacts with the presentation engine 300 and executes a search query or otherwise establishes a collection of objects. While this description refers to the collection of "objects," it will be understood that the same steps can be performed with respect to data such as web pages or unstructured text that are not necessarily objects from the repository 115.

The presentation engine 300 analyzes 812 the objects to identify facts having positions in inherent linear orders contained therein. In the embodiment where the linear graph is a timeline, the presentation engine 300 identifies facts containing dates. Some dates are explicitly identified by the objects, while others are not. In other embodiments, the presentation engine 300 identifies facts other than dates.

The presentation engine 300 determines 814 a scale for the linear graph based on the values of the identified facts. In one embodiment, the scale ranges from the lowest identified value to the highest identified value (e.g., from the earliest date to the latest date). In other embodiments, the scale is based on other criteria. For example, the presentation engine 300 can select a scale that encompasses only a subset of the facts, and provide UI tools that the user can use to alter the scale and/or display a different subset of the facts.

The presentation engine 300 presents 816 a linear graph displaying the facts in the inherent linear order. In the timeline embodiment, the linear graph displays facts from the objects in order of time, as illustrated in the examples of FIGS. 5-7. In addition, an embodiment of the presentation engine 300 displays a key indicating meanings of facts shown in the graph, and UI tools that the user can use to manipulate the graph. The key can be derived from other facts within the objects. In one embodiment, the presentation engine 300 also presents a map that shows objects having facts with geographic locations. By using the presentation engine 300, therefore, the user can view the facts of the objects in a manner increases comprehension.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed:

1. A computer-implemented method for presenting facts on a linear graph, comprising, at a computer system having a processor, memory and a display:
    storing a set of objects in the memory, each object having a set of two or more facts describing an entity associated with the object, each fact having an attribute and a corresponding value;
    identifying a first fact of a first object in the set of objects, the first fact including a first value having a first position in an inherent linear order and a first attribute;
    identifying a second fact of a second object in the set of objects, the second fact including a second value having a second position in the inherent linear order and a second attribute; and
    presenting on the display, a linear graph displaying the first and second values in accordance with the inherent linear order.

2. The method of claim 1, wherein the first value and the second value are dates, and wherein the linear graph displaying the facts is a timeline displaying dates of facts in the set of objects.

3. The method of claim 1, further comprising:
    analyzing the facts of the objects in the set to identify facts in the set of objects including dates; and
    presenting the dates of the identified facts on the linear graph.

4. The method of claim 1, further comprising:
    determining a scale for the linear graph responsive to values of the facts in the set of objects having positions in the linear sequence; and
    presenting the linear graph with the determined scale.

5. The method of claim 1, further comprising:
    identifying a third fact of a third object in the set of objects having a third position in the linear order, the third object including a fourth fact describing a geographic position; and
    presenting, on the display of the computer system,
        the linear graph displaying the first fact, the second fact, and the third fact in the linear order; and
        a map graphically representing the geographic position described by the fourth fact.

6. The method of claim 1, wherein the presenting comprises:
    presenting a respective icon on the linear graph, the respective icon representing a respective position of a respective fact in the linear order.

7. The method of claim 6, wherein the respective icon has a respective visual characteristic indicating a source of the respective fact having the respective position represented by the respective icon.

8. The method of claim 7, wherein the respective visual characteristic identifies a respective object in the set of objects including the respective fact.

9. The method of claim 1, wherein the presenting comprises:
    presenting a first icon on the linear graph, the first icon indicating the first defined position of the first fact in the linear order;
    presenting a second icon on the linear graph, the second icon indicating the second defined position of the second fact in the linear order, wherein the first defined position and the second defined position are at the same position in the linear order, wherein the second icon is presented adjacent to the first icon at a position orthogonal to an axis of the linear graph.

10. The method of claim 1, wherein the facts are extracted from web pages that include information about the entities.

11. The method of claim 10, wherein the first and second attributes are selected from the set including dates, prices, and populations, each of which has a respective inherent linear order.

12. A system for presenting facts on a linear graph, comprising:
    one or more processors;
    memory;
    a display; and
    one or more programs stored in the memory, the one or more programs comprising instructions to:
        store a set of objects in the memory, each object having a set of two or more facts describing an entity associated with the object, each fact having an attribute and a corresponding value;
        identify a first fact of a first object in the set of objects, the first fact including a first value having a first position in a an inherent linear order and a first attribute;
        identify a second fact of a second object in the set of objects, the second fact including a second value having a second position in the inherent linear order and a second attribute that is associated with the inherent linear order; and
        present on the display a linear graph displaying the first and second values in accordance with the inherent linear order.

13. The system of claim 12, wherein the first value and the second value are dates, and wherein the linear graph displaying the facts is a timeline displaying dates of facts in the set of objects.

14. The system of claim 12, further comprising instructions to:
    analyze the facts of the objects in the set to identify facts in the set of objects including dates; and
    present the dates of the identified facts on the linear graph.

15. The system of claim 12, further comprising instructions to:
  determine a scale for the linear graph responsive to values of the facts in the set of objects having positions in the linear order; and
  present the linear graph with the determined scale.

16. The system of claim 12, further comprising instructions to:
  identify a third fact of a third object in the set of objects having a third position in the linear order, the third object including a fourth fact describing a geographic position; and
  presenting, on the display of system,
    the linear graph displaying the first fact, the second fact, and the third fact in the linear order; and
    a map graphically representing the geographic position described by the fourth fact.

17. A computer-readable medium having computer program instructions embodied therein for presenting facts on a linear graph, the computer program instructions being operable when executed in a computer system having a processor, memory and a display to:
  store a set of objects in the memory, each object having a set of two or more facts describing an entity associated with the object, each fact having an attribute and a corresponding value;
  identify a first fact of a first object in the set of objects, the first fact including a first value having a first position in a an inherent linear order and a first attribute;
  identify a second fact of a second object in the set of objects, the second fact including a second value having a second position in the inherent linear order and a second attribute; and
  present on the display a linear graph displaying the first and second values in accordance with the inherent linear order.

18. The computer-readable medium of claim 17, wherein the first value and the second value are dates, and wherein the linear graph displaying the facts is a timeline displaying dates of facts in the set of objects.

19. The computer-readable medium of claim 17, further comprising instructions to:
  analyze the facts of the objects in the set to identify facts in the set of objects including dates; and
  present the dates of the identified facts on the linear graph.

20. The computer-readable medium of claim 17, further comprising instructions to:
  determine a scale for the linear graph responsive to values of the facts in the set of objects having positions in the linear order; and
  present the linear graph with the determined scale.

21. The computer-readable storage medium of claim 17, further comprising instructions to:
  identify a third fact of a third object in the set of objects having a third position in the linear order, the third object including a fourth fact describing a geographic position; and
  present, on the display of the computer system,
    the linear graph displaying the first fact, the second fact, and the third fact in the linear order; and
    a map graphically representing the geographic position described by the fourth fact.

22. A computer-implemented method for presenting facts on a linear graph, comprising, at a computer system having a processor, memory and a display:
  storing a set of data in the memory, the data describing two or more facts associated with an entity, each fact having an attribute and a corresponding value;
  identifying a first fact of the data in the set having a first position in an inherent linear order;
  identifying a second fact of the data in the set having a second position in the inherent linear order; and
  presenting on the display, a linear graph displaying the facts in the inherent linear order.

23. The method of claim 22, further comprising:
  analyzing unstructured data in the set of data items to identify facts including dates; and
  presenting the dates of the identified facts on the linear graph.

24. The method of claim 22, wherein the first value and the second value are dates, and wherein the linear graph displaying the facts is a timeline displaying dates of facts in the set of data items.

25. The method of claim 22, further comprising:
  identifying a third fact of a third object in the set of data items having a third position in the linear order, the third object including a fourth fact describing a geographic position; and
  presenting, on the display of the computer system,
    the linear graph displaying the first fact, the second fact, and the third fact in the linear order; and
    a map graphically representing the geographic position described by the fourth fact.

26. The method of claim 22, wherein the presenting comprises:
  presenting a respective icon on the linear graph, the respective icon representing a respective position of a respective fact in the linear order.

27. The method of claim 26, wherein the respective icon has a respective visual characteristic indicating a source of the respective fact having the respective position represented by the respective icon.

28. The method of claim 26, wherein the respective icon has a respective visual characteristic displaying an image related to the respective fact having the respective position in the linear order represented by the respective icon.

* * * * *

UNITED STATES PATENT AND TRADEMARK OFFICE
CERTIFICATE OF CORRECTION

PATENT NO. : 7,778,952 B2 Page 1 of 1
APPLICATION NO. : 11/535843
DATED : August 17, 2010
INVENTOR(S) : David J. Vespe et al.

It is certified that error appears in the above-identified patent and that said Letters Patent is hereby corrected as shown below:

Title page, item (73) delete "Google, Inc." and insert -- Google Inc. --.

Column 17, line 32, please delete "a an inherent" and insert -- an inherent --.

Signed and Sealed this

Twenty-sixth Day of October, 2010

David J. Kappos
*Director of the United States Patent and Trademark Office*